United States Patent
Yamazaki et al.

(10) Patent No.: US 6,708,382 B2
(45) Date of Patent: Mar. 23, 2004

(54) COMPLEX TOOL

(75) Inventors: Tsunehiko Yamazaki, Nagoya (JP); Sadami Miyazaki, Konan (JP)

(73) Assignee: Yamazaki Mazak Kabushiki Kaisha, Aichi-Ken (JP)

( * ) Notice: Subject to any disclaimer, the term of this patent is extended or adjusted under 35 U.S.C. 154(b) by 58 days.

(21) Appl. No.: 09/947,769

(22) Filed: Sep. 5, 2001

(65) Prior Publication Data
US 2002/0029661 A1 Mar. 14, 2002

(30) Foreign Application Priority Data
Sep. 5, 2000 (JP) ........................................ 2000-268215
May 11, 2001 (JP) ........................................ 2001-141540

(51) Int. Cl.$^7$ ................................................ B23B 7/00
(52) U.S. Cl. ........................... 29/27 C; 29/27 R; 82/1.2; 82/150; 82/121; 407/48
(58) Field of Search ............................. 29/27 C, 27 R; 82/1.2, 150, 121; 407/48

(56) References Cited

U.S. PATENT DOCUMENTS

| 4,597,143 A | * | 7/1986 | Dombrowski ............... 29/27 R |
| 4,611,516 A |   | 9/1986 | Hochmuth et al. ........... 82/1.2 |
| 4,946,318 A | * | 8/1990 | David et al. ................. 407/42 |
| 5,071,292 A | * | 12/1991 | Satran ........................ 407/116 |
| 5,800,100 A | * | 9/1998 | Krenzer ...................... 408/224 |
| 5,927,167 A | * | 7/1999 | Naumann et al. ............. 82/1.11 |
| 6,158,927 A |   | 10/2000 | Cole et al. ................... 407/48 |

FOREIGN PATENT DOCUMENTS

| DE | 3733298 A1 | * | 4/1989 | ........... B23B/27/16 |
| JP | 2002-18609 | * | 1/2002 | ................. 29/26 A |

* cited by examiner

*Primary Examiner*—A. L. Wellington
*Assistant Examiner*—Dana M Ross
(74) *Attorney, Agent, or Firm*—Duane Morris LLP

(57) ABSTRACT

In a complex tool to be installed on a machine tool capable of turning machining and milling machining operations, a main body is provided, and carries inserts for turning machining, inserts for milling machining and inserts for drilling machining. Turning machining and drilling/milling machining operations can be executed using the inserts installed on the main body, without the need for tool exchange, saving time and labor. The inserts as installed have opposite rotational cutting directions, and are placed on opposite sides of concavities that extend radially inwardly and axially back from the end of the main body. The inserts can be placed at the same or different cutting distances and can be brought into engagement with the workpiece by selection of the relative orientations of the rotation axis and the workpiece.

13 Claims, 13 Drawing Sheets

F I G. 5
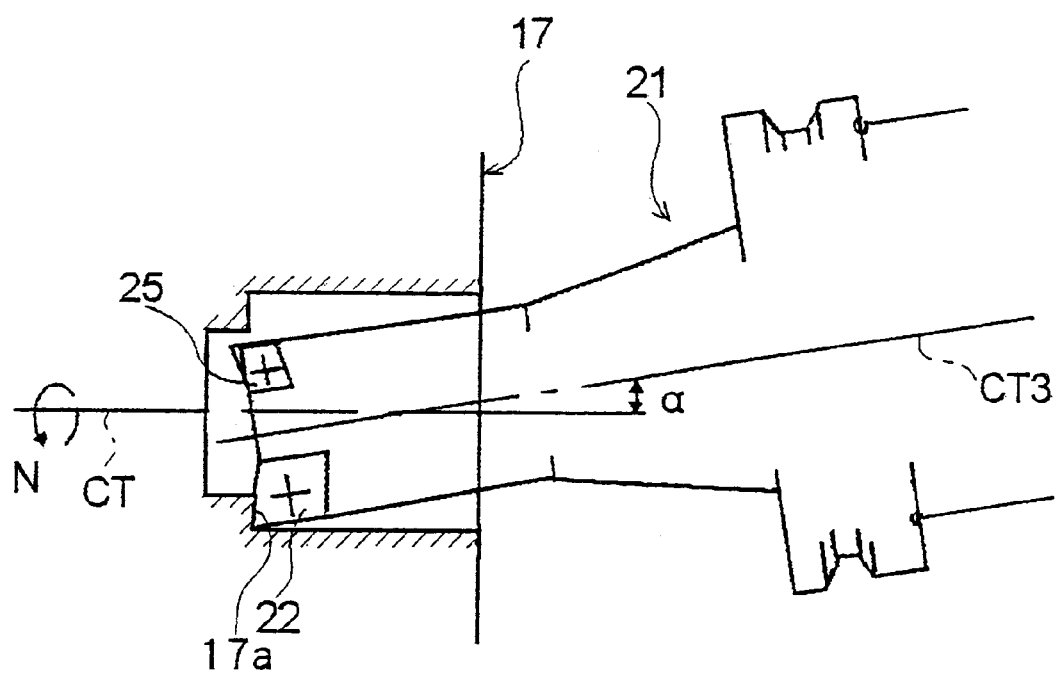

COMPLEX TOOL

BACKGROUND OF THE INVENTION

This invention relates to a complex machining machine tool capable of turning machining operations and milling machining operations, wherein a plurality of inserts are installed on a single holder portion and turning machining and rotational tool machining operations, such as drilling/milling machining, can be executed with one tool.

In such a machine tool, in the past, tools were divided into tools for turning machining and tools for drilling/milling machining. And, machining was performed in such a manner that a tool installed on a tool rest was attached and/or detached so as to exchange tools, for providing a tool fitting the machining operation to be performed next, for every change of machining operation in a sequence of operations.

In such a machine tool, it may be necessary to exchange tools for every new machining step. The time used for tool exchanges decreases machining efficiency, and is inconvenient. Accordingly, it was proposed to improve machining efficiency by avoiding the trouble of tool exchange operations, using a complex tool with a plurality of tools installed thereon.

As a result, however, the diameter of the complex tool was made bigger by having a plurality of cutting tools installed on the conventional cylindrical holder case. Certain drilling/milling machining operations were made impossible, although a plurality of kinds of turning machining operations could be accomplished.

The object of the present invention is to provide a complex tool having a smaller diameter, capable of a plurality of kinds of turning machining and drilling/milling machining operations with one tool, taking the above-mentioned circumstances into consideration.

SUMMARY OF THE INVENTION

The invention concerns a complex tool to be installed on a machine tool capable of executing turning machining and milling machining operations.

A main body is provided in a bar shape, for carrying inserts on its top end, which inserts are freely attached and detached.

A concave portion is formed on the main body, forming a void extending radially from an outer peripheral portion of said main body toward an axial center of said main body, and extending axially from a top end portion of said main body.

A plurality of insert installation faces are formed on said main body, the concave portion being located between them, and an insert being installed on a corresponding said insert installation face.

A plurality of insert installation faces are formed in the concave portion extending from the outer peripheral portion of the main body toward the axial center of the main body, with the concave portion being between the installation faces. The insert is directly installed on an insert installation face. A plurality of inserts can be located on the main body with high density on the respective installation faces. Even with a plurality of inserts is installed, the outer diameter of the complex tool is relatively small. Thus, inside diameter machining and end milling machining operations can be executed to a small diameter with the complex tool. Efficient machining is possible.

Cutting chips produced by the two inserts located in the concave portion can be eliminated through one such concave portion, thereby allowing the diameter of the complex tool to be even smaller. Insofar as the diameter of the tool can be reduced, the stability of machining operations at high speed can be improved.

A plurality of said concave portions can be formed, with corresponding benefits.

With a plurality of concave portions formed, a plurality of inserts can be provided at each concave portion. Several kinds of machining operations are made possible.

In one embodiment of the complex tool, wherein a concave portion is disposed between two inserts, the insert installation portions of the inserts are arranged such that the cutting directions of the respective inserts are opposite from each other.

The two inserts arranged to have cutting directions opposite from each other, can be located to oppose to each other, but to share the same concave portion. In that arrangement it is possible to place the inserts with high density.

A recess can be formed on the main body for said insert.

With a recess is formed on the main body of the complex tool, machining is possible without interference between the insert and the workpiece.

At least two inserts can have the same cutting direction. Of a plurality of said inserts, located on a plurality of said concave portions, the top edges of the inserts can be located at equal distance from the axial center of said main body.

With at least two inserts extending to the same such radial distance, drilling machining operations are possible to a diameter corresponding to the tool edge distance of the at least two inserts, i.e., making use of two or more inserts located with at the same distance. Milling machining operations are also possible, efficiently making use of a plurality of inserts.

According to a further aspect in addition to the foregoing, the insert can be located such that a top edge of said insert is offset relative to said concave portion side by a predetermined distance from a radial face having said axial center of said main body as its center.

With the insert located as described, offset on the concave portion side by a predetermined distance on a radial face intersecting the axial center of the main body, the main body portion for installing the insert can be made thick. This helps endure the stress generating during machining and prevents chatter.

According to one aspect, a plurality of such recesses are formed per insert.

With a plurality of such recesses formed for each insert, a plurality of different machining operations corresponding to the recesses are possible for each insert.

According to another aspect, said recesses include a recess formed on the top end of said main body, hollowing a central portion of said main body.

A recess formed on the top end of the main body, hollowing a central portion of the main body as described, helps to eliminate chips during drilling machining or milling machining operations. Smooth machining is possible.

According to one embodiment, a complex tool to be installed on a machine tool capable of executing turning machining and milling machining operations comprises a main body; an insert for turning machining operations, installed on said main body; and an insert for milling machining operations installed on said main body; whereby both turning machining and milling machining can be executed by said inserts installed on said main body without exchanging tools.

In that embodiment, turning machining is possible with the insert for turning machining operations installed on the main body, and milling machining is possible with the insert for milling machining operations. Both turning and milling machining can be executed without exchanging tools.

The complex tool of the invention is installed on a machine tool capable of executing turning machining and drilling machining by rotating the tool. The tool has a main body; an insert for turning machining installed on said main body; and an insert for drilling machining installed on said main body; whereby both turning machining and drilling machining by rotating the tool can be executed using said inserts installed on said main body and without exchanging tools.

Turning is possible with the insert for turning machining installed on the main body. Drilling machining is possible with the insert for drilling machining. Both turning and drilling machining operations are possible without tool exchange, saving trouble and time for tool exchange and improving efficiency.

The insert is preferably freely attached and detached from the main body. Thus, a worn or damaged insert can be easily exchanged, which is very convenient for maintenance.

The insert for turning machining can also serve as the insert for milling machining. In that case, more kinds of machining are possible with small numbers of inserts. Similarly, the insert for turning machining can also serve as the insert for drilling machining.

BRIEF DESCRIPTION OF THE DRAWINGS

FIG. 5 is a schematic view for showing turning drilling machining when the complex tool according to the present invention is used;

DESCRIPTION OF THE PREFERRED EMBODIMENTS

Figure 1:
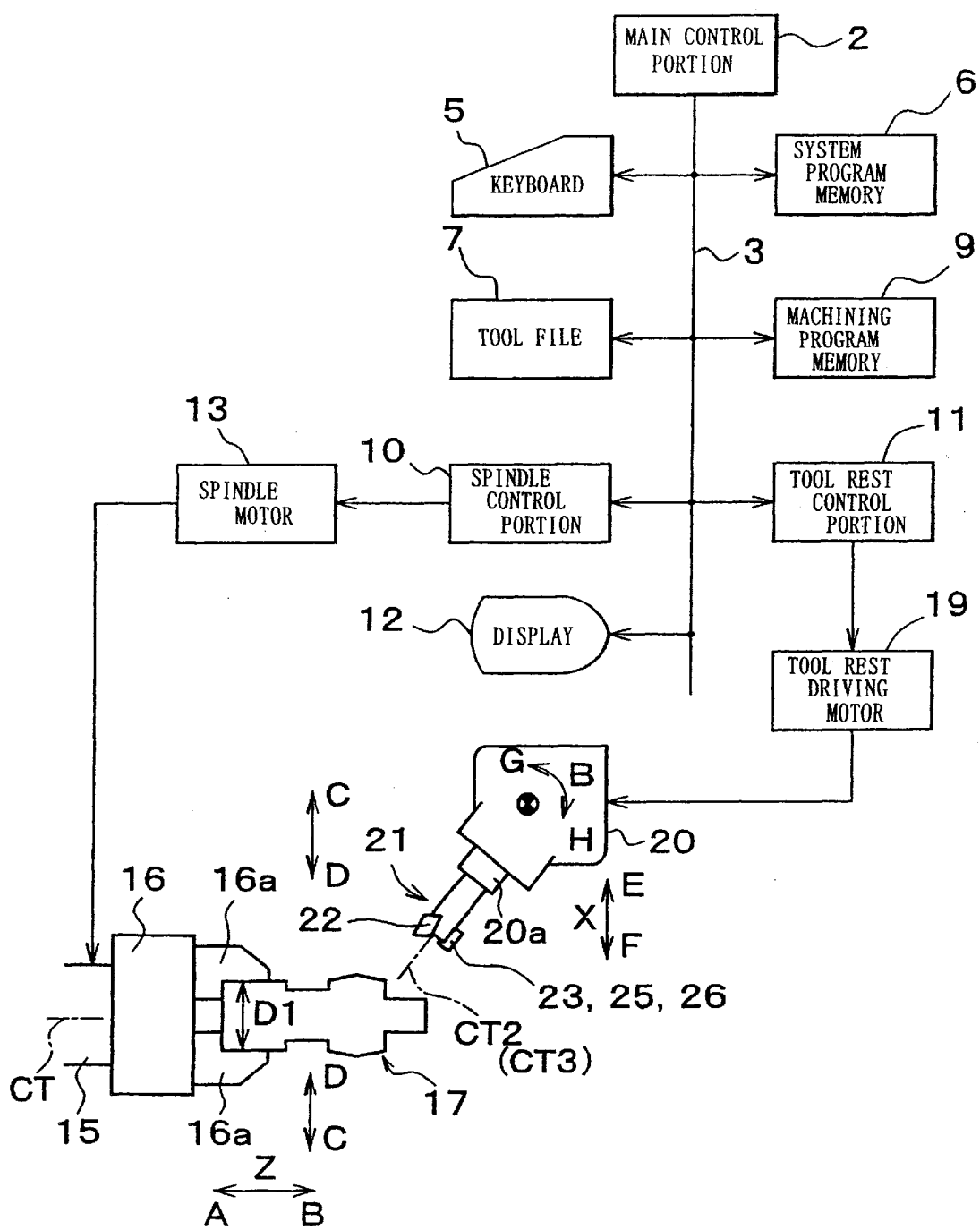
FIG. 1 is a control block diagram showing an example of a complex tool according to present invention and a complex machining machine tool to which the complex tool is applied.

FIG. 1 is a control block diagram showing an example of a complex machining machine tool to which the present complex tool is applied.

A complex machining machine tool 1 has a main control portion 2, as shown in FIG. 1. With the main control portion 2, an input portion, such as a keyboard 5, a system program memory 6, a tool file 7, a machining program memory 9, a spindle control portion 10, a tool rest control portion 11 and a display 12 are connected through a bus line 3. A spindle motor 13 is connected with the spindle control portion 10. With the spindle motor 13, a spindle 15 is connected, being free to rotate, drive and position with axial center CT provided parallel to a direction as shown by arrows A and B, that is, with a Z-axis as its center. With the spindle 15, a chuck 16 is provided, which is an example of means for installing a workpiece. Claws 16*a*, 16*a* are provided with the chuck 16, being free to hold and release a workpiece 17 to be machined having an outer diameter D1, being free to move and drive in a direction as shown by arrows C and D.

Tool rest driving motors 19 (the plural number) are connected with the tool rest control portion 11. A tool rest 20 is connected with the tool rest driving motor 19, being free to move and drive in the Z-axis direction and in the direction as shown by arrows E and F rectangular to the Z-axis, that is, in the X-axis direction by the tool rest driving motors 19. Furthermore, the tool rest 20 is provided, being free to move and drive in Y-axis direction rectangular to the X-axis and Z-axis, and rectangular to the paper, and in the direction as shown by arrows G and H which is B-axis direction with the Y-axis as its center by the tool rest driving motors 19.

A tool holding portion 20*a* is formed on the tool rest 20. A turning tool or a complex tool 21 according to the present invention (described hereinafter in detail), capable of milling/drilling machining is provided with the tool holding portion 20*a*, being free to attach, detach and exchange. The tool holding portion 20*a* is provided, being free to fix and hold the complex tool and other tools in a predetermined holding state, and being free to rotate, drive and position around rotational axis (axial center) CT2. When a main body 21*a* of the complex tool is installed in the tool rest 20, the installation is executed so as to correspond the rotational axis (axial center) CT2 of the tool rest and an axial center of the main body (also corresponds to "an axial center of the complex tool") CT3 with each other.

Figure 2:
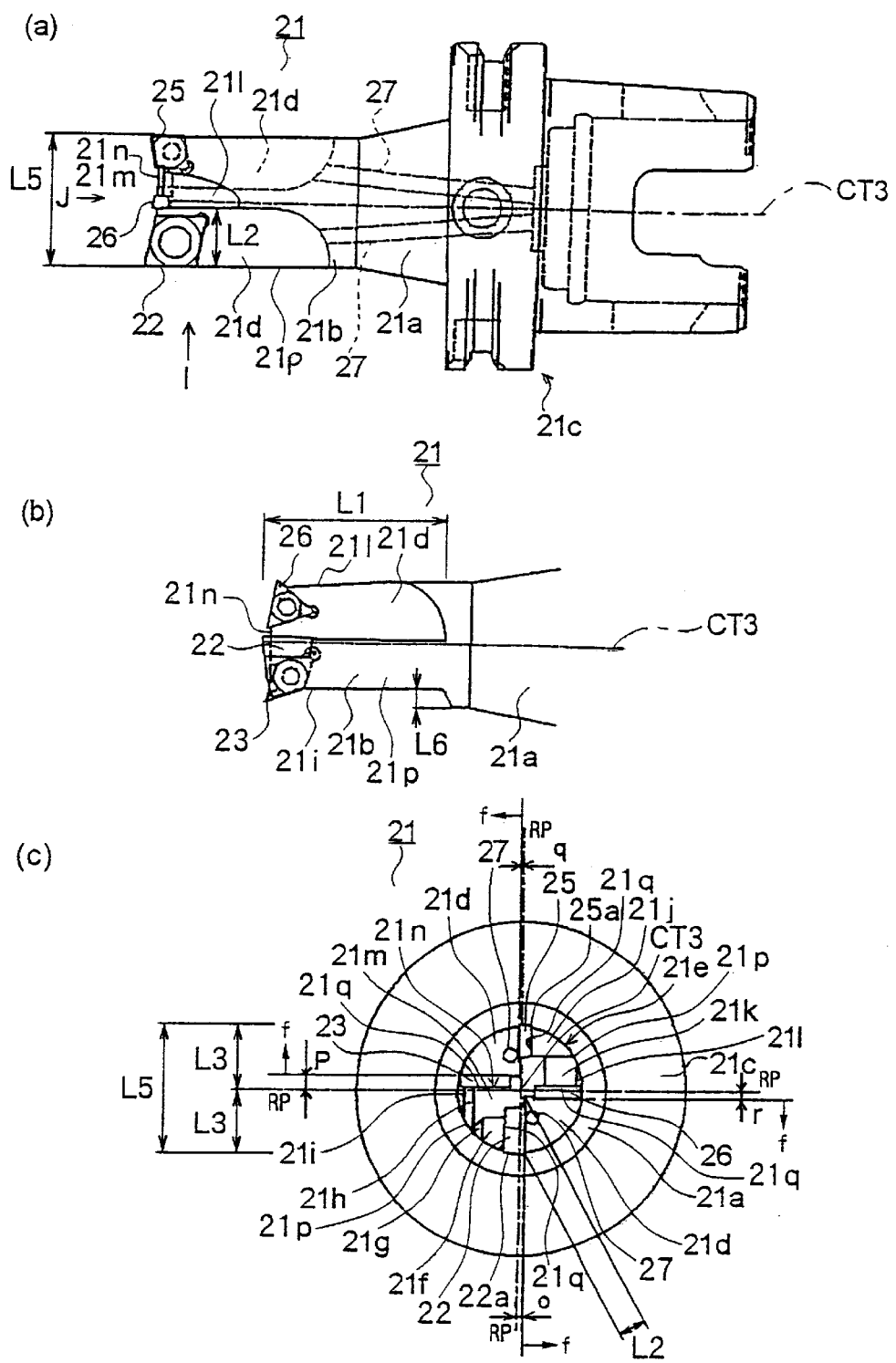
FIG. 2 is a multi-part view showing an example of the present complex tool, wherein (a) is a front view, (b) is a view seen from arrow I of (a), and (c) is a view seen from arrow J of (a)

FIG. 2 is a view for showing an example of the present complex tool, (a) is a front view, (b) is a view seen from arrow I of (a) and (c) is a view seen from arrow J of (a). And, FIG. 3 is a schematic view obliquely showing an example of the present complex tool.

Figure 3:
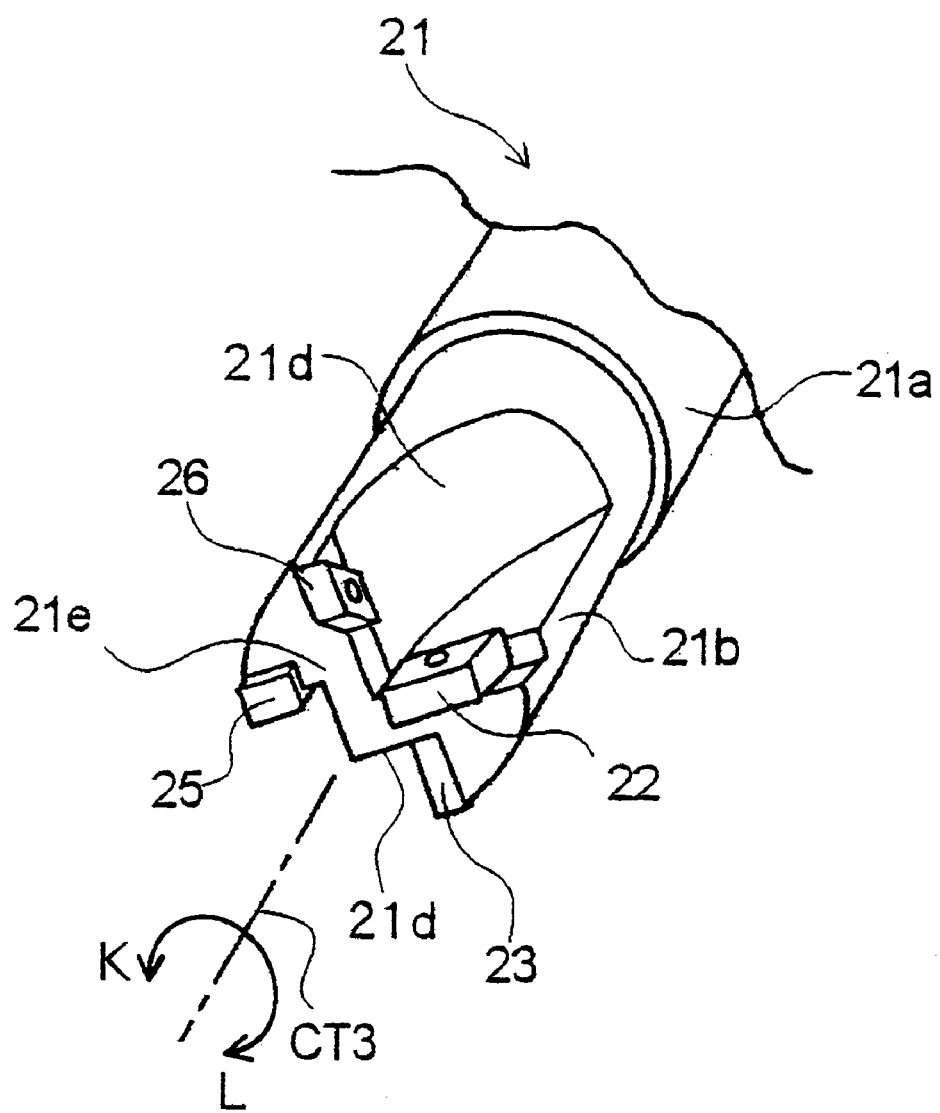
FIG. 3 is a schematic view obliquely showing an example of the present complex tool.

As shown in FIG. 2 and FIG. 3, the complex tool 21 has the main body 21*a* in a round bar shape, taperingly formed on the right hand side of FIG. 2(*a*). The main body 21*a* has an engagement portion 21*c* (the right hand from near the center of FIG. 2(*a*)) in approximately a disc shape, and in approximately a U-shape in its side, for engaging the complex tool 21 with the tool holding portion 20a of the complex machining machine tool 1 so as to install. At the top end of the main body 21a, an insert installation portion 21b is formed.

Concave portions ("chip pockets" hereinafter) 21d, 21d are provided with the insert installation portion 21b along the axial center CT3 of the main body 21a, extending from top end 21n of the main body 21a by a distance L1. Each chip pocket 21d is provided in the shape of an L character of groove with depth L2 from a main body outer peripheral portion 21p near the insert installation portion 21b. The chip pocket 21d depth L2 is made smaller approaching a base portion of the main body 21a, that is, with approaching the right hand of FIG. 2(a). And, the chip pockets 21d, 21d are formed on two portions at the pitch of about 90° with the axial center CT3 of the main body 21a as its center, with almost point symmetry, as shown in FIG. 2(c). Besides, insert installation faces 21q are formed on the main body 21a of the top end of the insert installation portion 21b, putting each chip pocket 21d therebetween. Four inserts 22, 23, 25, 26 are installed on the respective installation faces 21q, each being attachable so as to face the chip pockets 21d, 21d and detachable for removal or replacement.

The inserts 22, 25 of the four inserts 22, 23, 25, 26 are located in such a manner that a perpendicular force f acting on a surface of the side facing the chip pocket 21d generates left rotation force with the axial center CT3 of FIG. 2(c) as its center. And, the inserts 23, 26 are located in such a manner that perpendicular force f acting on the surface of the side facing the chip pocket 21d generates right rotation force with the axial center CT3 of FIG. 2(c) as its center. That is, the inserts 22, 25 and the inserts 23, 26 are respectively located in such a manner that respective cutting directions are opposite from each other. With respect to the inserts 22 and 26, the inserts 23 and 25, which are respectively located at one same chip pocket 21d, 21d facing each other, the cutting directions of these inserts 22 versus 26, and the inserts 23 versus 25, are opposite from each other.

The inserts 22, 25, located on the different chip pocket 21d, having the same cutting direction are installed in such a manner that the distance between top end 22a of outer peripheral portion and the axial center CT3 and the distance between top end 25a of outer peripheral portion and the axial center CT3 are both at a distance L3, as shown in FIG. 2(c). By doing so, the top end 22a of the insert 22 and the top end 25a of the insert 25 can be rotated on a locus of a concentric circle by rotating the complex tool 21 around the axial center CT3. In that embodiment, two cutting passes can be executed by the inserts 22, 25 for each rotation during drilling machining or milling machining operations, for instance. Machining efficiency is improved.

As shown in FIG. 2(c), recesses are formed on the peripheral portions of the inserts 22, 23, 25, 26 so as to cope with machining operations. A recess 21f is gradually inclined from the top end 21n of the main body 21a toward the direction of the root (the innermost direction of the paper of the figure) of the complex tool 21, and the outer peripheral portion 21q of the main body. The recess 21f is formed on the installation face 21q side of the insert 22. Furthermore, a recess 21g is provided with the recess 21f, and is inclined to the outer peripheral portion 21p of the main body 21 a, continuing to the recess 21f.

A recess 21h is gradually inclined from the top end 21n of the main body 21a toward the direction of the root (the innermost direction of the paper of the figure) of the complex tool 21 and the outer peripheral portion. The recess 21h is formed on the installation face 21q side of the insert 23. Furthermore, a recess 21i, wherein the outer peripheral portion 21p of the main body 21a is offset a predetermined quantity L6, is formed on the outer periphery side of the recess 21h, as shown in FIG. 2(b).

A recess 21j that is gradually inclined from the top end 21n of the main body 21a toward the direction of the root (the innermost direction of the paper of the figure) of the complex tool 21 and the outer peripheral portion 21p, is formed on the installation face 21q side of the insert 25. Furthermore, a recess 21l is formed, notching the outer peripheral portion 21p in a part, as shown in FIG. 2(a).

A recess 21m, having a concave shape in the vicinity of the axial center CT3 of the central portion of the main body 21a as its center, is formed on the surface of the top end 21n of the main body 21a. The concave shaped recess is surrounded by the four inserts 22, 23, 25, 26. According to his aspect, interference of the respective inserts 22, 23, 25, 26 with respect to the workpiece 17 during machining operations, can be effectively avoided.

The location of the respective inserts 22, 23, 25, 26 preserves the thickness of an insert supporting portion 21e (the portion sandwiched between the chip pockets 21d, 21d) by which the inserts are supported through the insert installation face 21q, especially the thickness of the periphery of the axial center CT3 of the main body. Each tool edge is offset outwardly by a predetermined distance from the associated supporting portion 21e, which allows the thickness of the insert supporting portion 21e to be bigger, that is, in the direction of the chip pocket 21d from a radial face with the axial center CT3 as its center, as shown in FIG. 2(c). That is, the insert 22 is located, at an offset distance o relative to a strictly radial face RP with the axial center CT3 as its center. Similarly, distance p for the insert 23, distance q for the insert 25, and distance r for the insert 26, provide comparable offsets from respective radial planes intersecting axial center CT3.

Offsetting of the tool edge with respect to the axial center CT3 which is the rotational center of the tool, has in the past presented certain problems, such as a dimensional error after machining, because it is difficult accurately to contact the tool edge with the workpiece. But, by moving the tool rest 20 by the above-mentioned offset distance in the Y-axis direction, the tool edge can be positioned at a proper position corresponding to the center of the workpiece (Z-axis). The wider thickness of the vicinity of the axial center CT3 of the insert supporting portion 21e is preserved, providing strength against turning resistance. The complex tool 21 can be made smaller.

During drilling machining operations, a hole having a diameter bigger than that of the main body 21a can be machined by rotation and axial advance of the complex tool 21, thereby moving the tool edges of inserts 22 and/or 25 along a helix. The tool edge of insert 22 or 25 is elongated along the axial center CT3, and the main body 21a is rotated on the axial center CT3. The tool edges 22a and 25d of inserts 22, 25 are located at equal radial distance from the axial center CT3. Thus, a hole having diameter equal to the distance L5 between the inserts 22 and 25, almost as small as the main body 21a, can be machined similar to the case wherein a drill with a nominal diameter is L5 is used.

Holes 27, 27 are provided with the complex tool 21 for adding cutting oil from almost a central position on the inner diameter side of the engagement portion 21c on the inclined faces of the chip pockets 21d, 21. Cutting oil thereby can be added in the present complex tool 21 during machining, including when doing inner diameter machining, wherein it is difficult to add cutting oil. The holes 27, 27 are not formed on the top end portions of the insert installation portion 21b, but in the chip pockets 21d, 21, so that the strength of the top end portions can be preserved. As a result, the complex tool 21 can be made compact.

As explained heretofore, the diameter of the present complex tool 21 can be relatively small. With a smaller tool, stability during high speed rotation is improved. Besides, the extent of drilling/milling machining operations can be extended, since inner diameter machining on small diameter and high speed rotation are possible.

Since the present complex tool 21 has the above-mentioned structure, a plurality of machining operations can be executed by using complex tool 21 in machine tool 1. Exemplary methods of machining with the present complex tool 21 will now be explained, referring to the drawings.

When machining is executed using the present complex tool 21 as shown in FIG. 1, an operator first inputs machining data by a method of known automatic programming, e.g., by operating the keyboard 5 so as to compose a machining program. The main control portion 2 then composes a sequence of machining program steps on the basis of the machining data input by the operator according to the known automatic program, stored in the system program memory 6. The machining program thus composed is stored in the machining program memory 9.

After the machining program concerning a workpiece 17 is composed, an operator instructs the main control portion 2 to machine the workpiece 17, using the keyboard 5 for such instructing. Receiving this, the main control portion 2 reads out the machining program concerning the workpiece 17 from the machining program memory 9 so as to accomplish the machining operations, appropriately driving the spindle control portion 10 and the tool rest control portion 11.

The tool to be used any given time is designated by the machining program. In view of a tool to be used being designated by the machining program, the main control portion 2 refers to the tool file 7 and reads out tool data for the corresponding tool. In the tool file 7, the tool data necessary for machining is set for each tool as data in a chart or tabular form.

For example, for the complex tool 21, an indexing angle around the axial center CT2 (CT3) of the tool holding portion 20a (A-axis) is designated for each of the inserts 22, 23, 25, 26 according machining contents or steps that are shown by the tool file 7 to be possible using the complex tool 21. By this A-axis indexing angle, the complex tool 21 is rotated and driven a predetermined A-axis angle from an origin angular position around the axial center CT2 of the tool holding portion 20a of the tool rest 20 (in the direction as shown by arrows K and L of FIG. 3). This operation selects the insert 22, 23, 25 or 26 to be used for a next machining step and positions the selected insert at a predetermined position relative to the workpiece.

Additionally, a B-axis indexing angle to be assumed when machining with the inserts 22, 23, 25, 26 is stored for each machining step to be accomplished with the respective inserts 22, 23, 25, 26, defined in the tool file 7. In the event that a predetermined insert is selected by an A-axis index angle, the selected insert can be rotated around the B-axis at this time so as to index concerning the B-axis by a B-axis indexing angle. The insert is rotated and moved in the direction as shown by arrows G and H in the plane parallel to the X-Z plane so as to position the selected insert at the position that fits the machining operation to be executed next, which remains until changed as needed for a new operation.

The A-axis indexing angle and the B-axis indexing angle are designated in the tool file 7. In this way, a tool from the plurality of available inserts 22, 23, 25, 26, is appropriately selected and arranged to facilitate machining operations.

The tool rest control portion 11 can drive a tool exchanger (not shown) and in that case selects the complex tool 21 from a tool magazine (not shown) so as to install the selected complex tool 21 on the tool rest 20. After the complex tool 21 is installed on the tool rest 20, the tool rest control portion 11 refers to detailed data for the tool and its corresponding insert(s) from the tool file 7 , and the steps designated in the machining program, so as to read out the A-axis indexing angle and the B-axis indexing angle.

The tool rest control portion 11 drives and controls a tool driving motor (not shown) built in the tool rest on the basis of the A-axis indexing angle and the B-axis indexing angle, which are read out so as to rotate the complex tool 21 around the axial center CT3. Then, the insert 22, 23, 25 or 26 to be used for machining is selected and positioned. Besides, the B-axis driving motor is driven and the tool rest 20 is moved and driven in the direction as shown by the arrows G and H so as to position the selected insert at a predetermined position.

Thereafter, the spindle 15 is rotated and driven at predetermined rotational numbers by the spindle driving motor 13, so as to cause the workpiece 17 to rotate, or the tool holding portion 20a can be rotated and driven around the axial center CT2 by the tool driving motor so as to cause the complex tool 21 to rotate. The machining operations are executed according to the machining program as mentioned before, appropriately driving the workpiece 17 through the spindle control portion 10 and the complex tool 21 through the tool rest control portion 11.

As mentioned before, the required insert 22, 23, 25 or 26 is selected by indexing the complex tool 21 into position at a predetermined A-axis indexing angle, by the complex machining machine tool 1. The complex tool 21 is indexed and positioned at the B-axis indexing angle. These and subsequent movements locate the selected insert at a predetermined operative machining position to engage with the workpiece during machining operations. As the tool rest 20 is driven also in the X direction and in the Z direction and the rotation and rotational direction of the workpiece 17 or the complex tool 21 is controlled and driven, a plurality of machining operations can be executed.

The invention saves time otherwise needed for tool exchanges when effecting turning machining and drilling/milling machining operations, because a plurality of kinds of turning machining and drilling/milling machining can be executed using one complex tool 21.

In the past, it was necessary separately to prepare a tool for turning machining operations and a tool for drilling/milling machining operations. But, it is sufficient to prepare only one complex tool 21 according to the present invention, which can accomplish both types of operations. This reduces the cost of tools when a plurality of machining operations are necessary.

Exemplary embodiments when the complex tool 21 of the present invention is used will now be explained, referring to the drawings.

Figure 4:
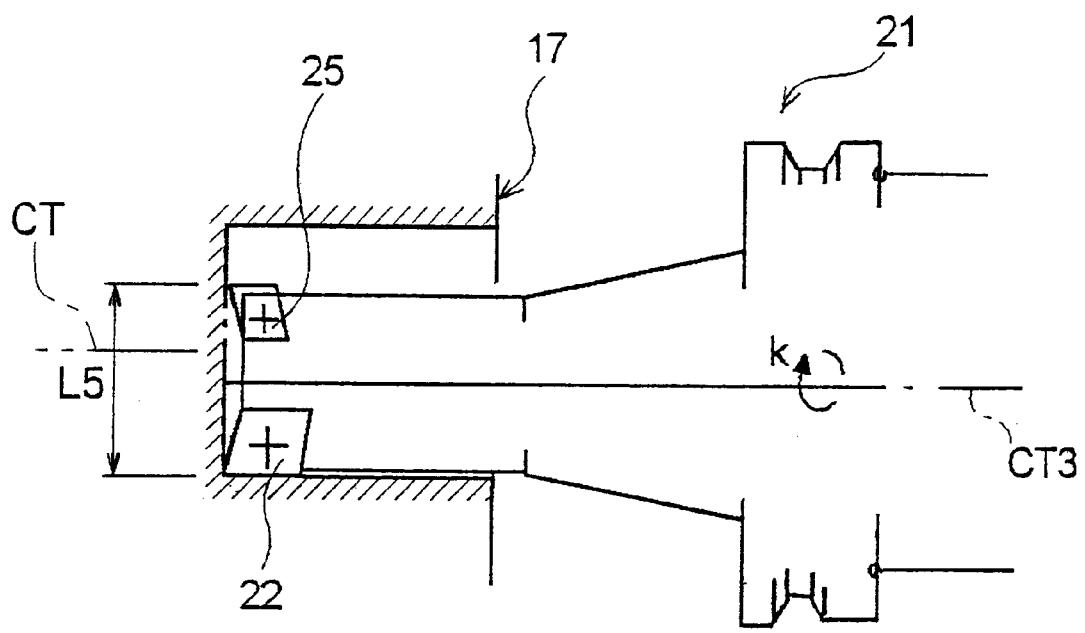
FIG. 4 is a schematic view for showing drilling machining when the complex tool according to the present invention is used.
Figure 6:
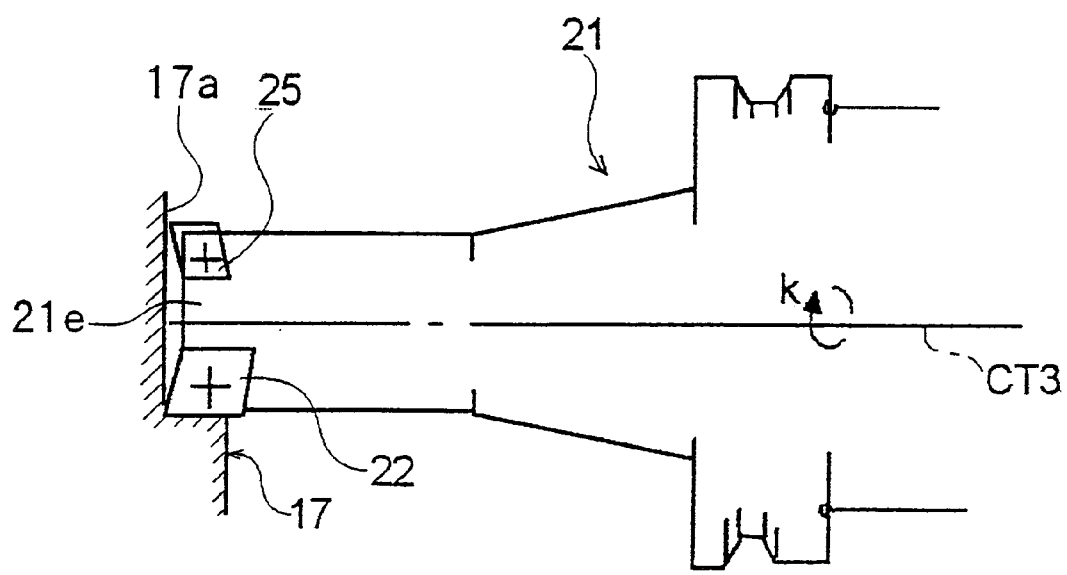
FIG. 6 is a schematic view for showing end milling machining when the complex tool according to the present invention is used.
Figure 7:
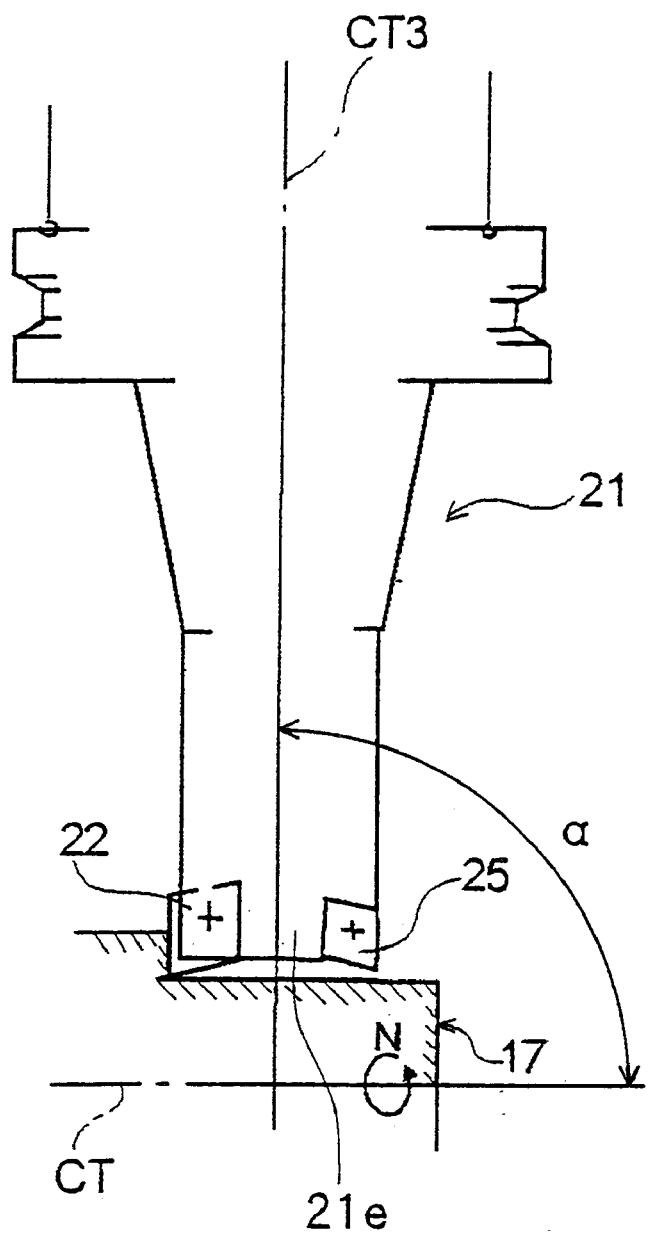
FIG. 7 is a schematic view for showing turning rough machining of outer diameter when the complex tool according to the present invention is used.
Figure 8:
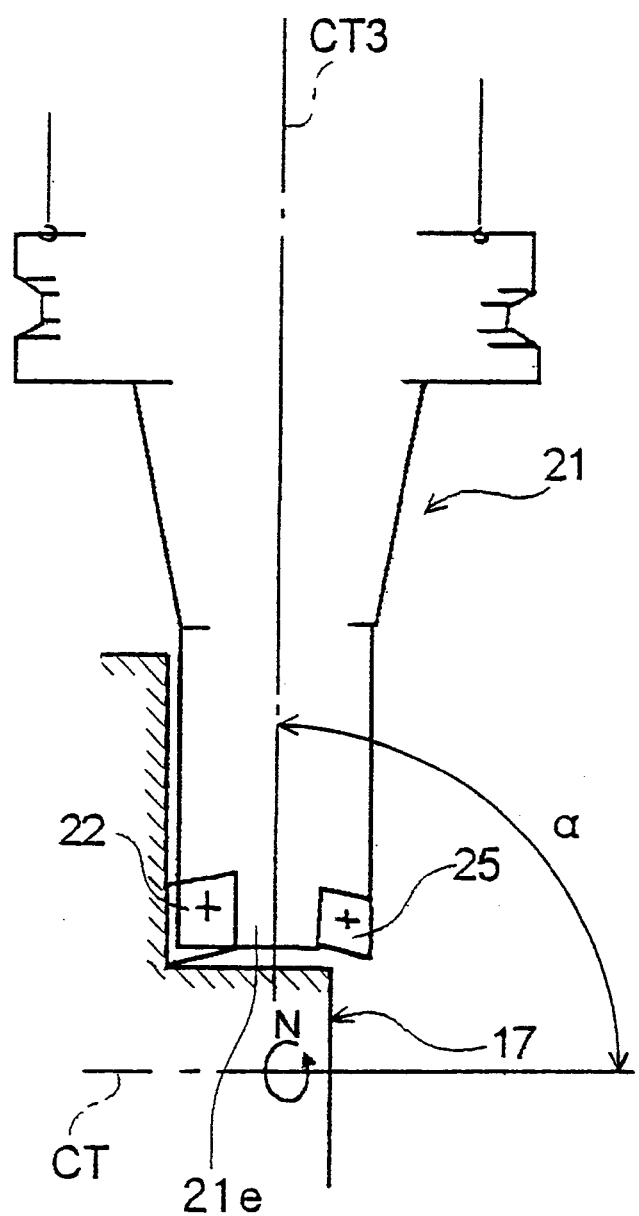
FIG. 8 is a schematic view for showing turning rough machining of end face of outer diameter when the complex tool according to the present invention is used.
Figure 9:
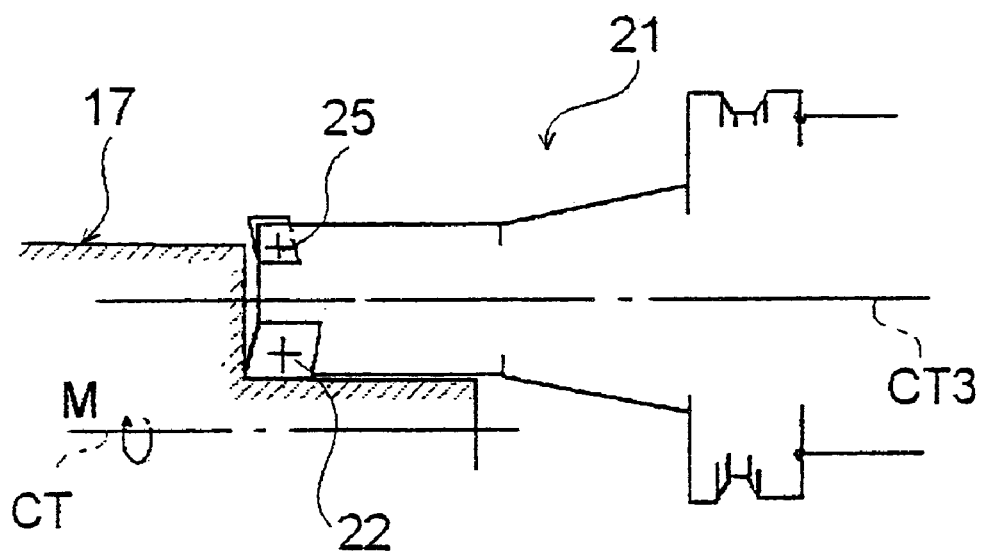
FIG. 9 is a schematic view for showing turning rough machining of end face of outer diameter when the complex tool according to the present invention is used.
Figure 10:
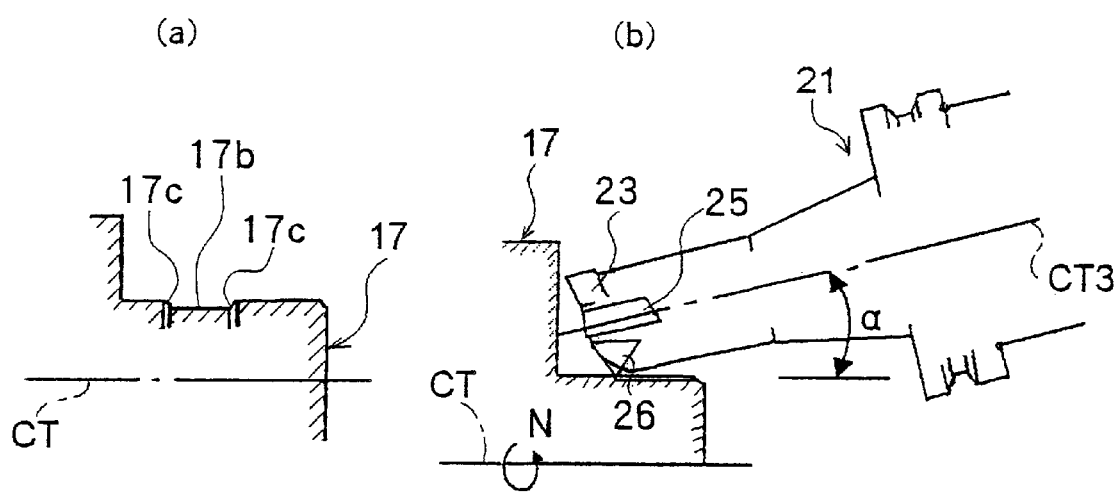
FIG. 10(*a*) is a schematic view for showing groove machining of outer diameter and FIG. 10(*b*) is a schematic view for showing screw machining of outer diameter when the complex tool according to the present invention is used.
Figure 11:
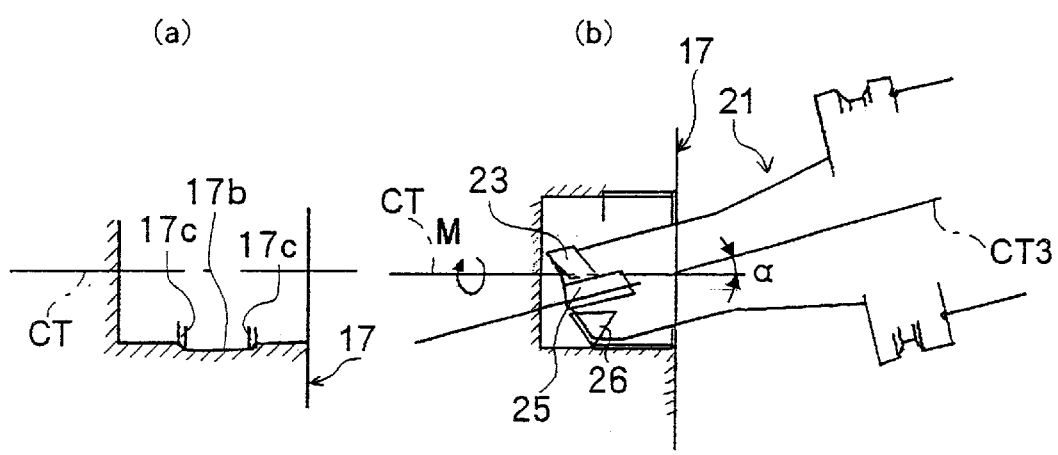
FIG. 11(*a*) is a schematic view for showing groove machining of inner diameter and FIG. 11(*b*) is a schematic view for showing screw machining of inner diameter when the complex tool according to the present invention is used.
Figure 12:
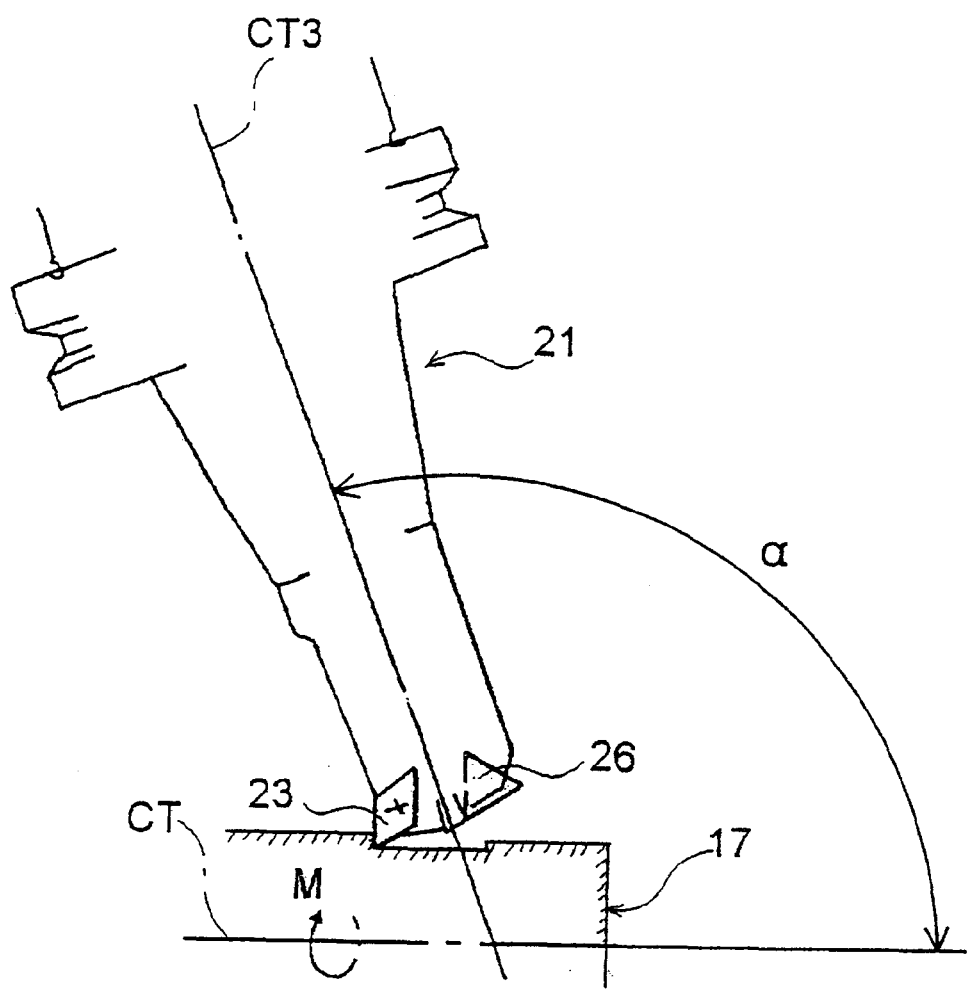
FIG. 12 is a schematic view for showing groove machining of outer diameter when the complex tool according to the present invention is used.
Figure 13:
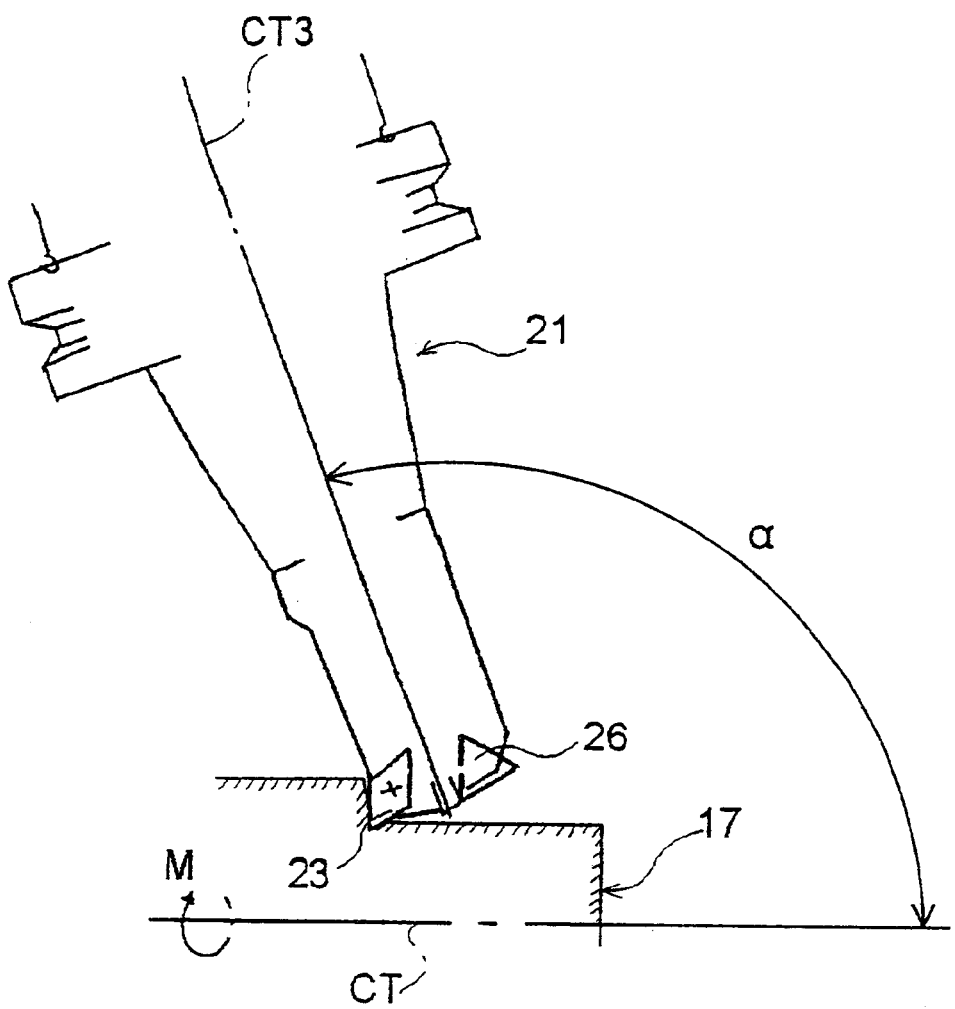
FIG. 13 is a schematic view for showing recess machining when the complex tool according to the present invention is used.

FIG. 4 is a schematic view showing a drilling machining operation using the complex tool according to the invention. In a similar way, FIG. 5 is a schematic view showing a turning drilling machining operation. FIG. 6 is a schematic view showing an end milling machining operation. FIG. 7 is a schematic view showing turning rough machining of an outer diameter. FIG. 8 and FIG. 9 are schematic views showing turning rough machining via an end face to form an outer diameter. FIG. 10(a) is a schematic view showing machining of a recessed outer diameter. FIG. 10(b) is a schematic view showing screw machining of an outer diameter. FIG. 11(a) is a schematic view showing groove machining of an inner diameter. FIG. 11(b) is a schematic view showing screw machining of an inner diameter. FIG. 12 is a schematic view showing groove machining of an outer diameter. FIG. 13 is a schematic view showing recess machining for grinding.

When drilling machining is executed as shown in FIG. 4, the tool rest 20 is driven in the direction as shown by the arrows G and H by the B-axis driving motor (see also FIG. 1) so as to position the tool such that the angle of the axial center CT3 is 0°. (The angle of the axial center CT3 is parallel to the axis CT of the spindle 15 at the reference angle of 0°.) In this state wherein the spindle 15 is controlled by the spindle control portion 10 and the workpiece 17 is fixed, the complex tool 21 is rotated around the axial center CT3 in the direction as shown by the arrow K (FIG. 4) for a predetermined number of rotations. The position of the complex tool 21 relative to to the workpiece 17 is then properly driven and moved by the tool rest control portion 11. The workpiece 17 is thereby drilled by the inserts 22, 25 so as to execute a drilling machining operation. And, the top end portion of the insert support portion 21e of the main body 21a has the above-mentioned recesses 21f, 21g, 21j and the recess 21m which are such that the top end center has a concave shape. As a result, machining operations can be executed without interference between the workpiece 17 and the insert supporting portion 21e of the top end portion of the main body 21a. The complex tool 21 is properly driven and rotated around the axial center CT of the workpiece by the tool rest control portion 11. The the B-axis angle of the axial center CT3 can remain at 0° in such a state that the workpiece 17 is fixed and held while the complex tool 21 executes a helical machining maneuver, thereby executing a drilling machining operation to form a diameter bigger than the outer diameter L5 of the complex tool 21. In that case, chips due to cutting are eliminated to the outside through the chip pocket 21d.

When a turning drilling machining operation is executed as shown in FIG. 5, the B-axis angle α of the axial center CT3 of the complex tool 21 can be positioned at 10° so as to fix the complex tool 21 and the workpiece 17. The tool is rotated a predetermined number of rotations in the direction as shown by arrow N according to the machining program in a similar way to that described above. And, the complex tool 21 is properly driven and moved with respect to the workpiece 17. Then, the workpiece is turned by the insert 22 so as to execute a turning drilling machining operation. The top end portion of the insert support portion 21e of the top end portion of the main body 21a has the above-mentioned recesses 21f, 21g and the recess 21m by which the top end center has a concave shape. Accordingly, machining can be executed without interference between a wall portion 17a of the workpiece 17 and the insert supporting portion 21e.

When end milling machining is executed as shown in FIG. 6, the B-axis angle α of the axial center CT3 of the complex tool 21 is positioned at 0° so as to fix the workpiece 17. The complex tool 21 is rotated for a predetermined number of rotations in the direction as shown by arrow K according to the machining program, in a similar way to that described. The complex tool 21 is properly driven and moved with respect to the workpiece 17 in the X plane and in the Y plane in such a state that the B-axis angle α of the axial center CT3 remains fixed at 0°. The workpiece 17 is milled by engagement of the inserts 22, 25 so as to execute an end milling machining step. And, the top end portion of the insert support portion 21e has the above-mentioned recesses 21f, 21g, 21j and the recess 21m, by which the top end center has concave shape enabling machining to be executed without interference between the wall portion 17a of the workpiece 17 and the insert supporting portion 21e.

When turning rough machining of an outer diameter is executed as shown in FIG. 7, the insert 22 of the complex tool 21 is selected, and the B-axis angle α of the axial center CT3 of the complex tool 21 is positioned at 92°, for instance. The workpiece 17 is rotated in the direction shown by arrow N at a predetermined speed and/or interval according to the machining program as already described. And, the complex tool 21 is properly driven and moved with respect to the workpiece 17. The workpiece 17 is turned by the insert 22 to execute turning rough machining of an outer diameter. When turning finishing machining of outer diameter is executed, the insert 25 is selected according to the machining program and the B-axis angle α of the axial center CT3 of the complex tool 21 is positioned at 92° so as to execute similarly. And, the top end portion of the insert support portion 21e of the main body 21a has the above-mentioned recesses 21f, 21g, 21j and the recess 21m by which the top end center has a concave shape. Thus, machining can be executed without interference between the workpiece 17 and the insert supporting portion 21e.

When turning rough machining of and end face outer diameter is executed as shown in FIG. 8, the insert 22 is selected. The B-axis angle α of the axial center CT3 of the complex tool 21 is positioned at 91° so as to fix the complex tool 21 and the workpiece 17 as shown. The device is rotated at predetermined rotational conditions in the direction as shown by arrow N according to the machining program. The complex tool 21 is properly driven and moved with respect to the workpiece 17. Then, the workpiece 17 is turned by the insert 22 so as to execute a turning rough machining operation at the end face to form an outer diameter. When the turning finishing machining operation at the end face is executed to form the required required outer diameter, the insert 25 is selected according to the machining program. The B-axis angle α of the axial center CT3 of the complex tool 21 is positioned at 91° so as to execute similarly. In each case, the top end portion of the insert support portion 21e and its above-mentioned recesses 21f, 21g, 21j and the recess 21m are such that the top end center is concave in shape. This permits the machining operation to be executed without interference between the workpiece 17 and the insert supporting portion 21e of the main body 21a.

Turning rough machining at the end face to form an outer diameter can be executed as shown in FIG. 9. The insert 22 is selected. The B-axis angle α of the axial center CT3 of the complex tool 21 is positioned at 0°. The complex tool 21 and the workpiece 17 are relatively rotated at the predetermined number of rotations or speed and time, in the direction as shown by arrow M, according to the machining program. The complex tool 21 is driven and moved with respect to the workpiece 17. The workpiece 17 is turned by the insert 22, which executes turning rough machining of end face and outer diameter. When a turning finishing machining operation of the end face and outer diameter is executed, the insert 25 is selected. The machining program sets the B-axis angle α of the axial center CT3 of the complex tool 21 at 0°, and executes similarly. Again, the top end portion of the insert support portion 21e has the above-mentioned recesses 21f, 21g, 21j and the recess 21m which cause the top end center to have a concave shape. Machining can be executed without interference between the workpiece 17 and the insert supporting portion 21e.

Groove machining of an outer diameter is shown in FIG. 10(a) and screw machining of an outer diameter is shown in FIG. 10(b). The insert 26 is selected. The B-axis angle α of the axial center CT3 of the complex tool 21 is positioned at 20° so as to fix the complex tool 21 relative to the workpiece 17. Rotation proceeds for a predetermined number of rotations in the direction shown by arrow N according to the machining program. The complex tool 21 is properly driven and moved with respect to the workpiece 17 in the axial center CT direction. The workpiece 17 is turned by the insert 26 so as to execute groove machining of an outer diameter or screw machining of the outer diameter. At the time of groove machining of the outer diameter, both end portions 17c, 17c of a groove 17b can be chamfered by the shape of the insert 26 during the same turning. The top end portion of the insert support portion 21e has the above-mentioned recesses 21k, 21l and the recess 21m which render the top end center concave, and permit machining to be executed without interference between the workpiece 17 and the insert supporting portion 21e.

When groove machining of an inner diameter is executed as shown in FIG. 11(a) or screw machining of an inner diameter as shown in FIG. 11(b), the insert 26 is selected. The B-axis angle α of the axial center CT3 of the complex tool 21 is positioned at 20° so as to fix the complex tool 21 and the workpiece 17. Rotation is in the direction of arrow M according to the machining program, to execute groove machining of the inner diameter or screw machining of the inner diameter. During groove machining of the inner diameter, both end portions 17c, 17c of the groove 17b can be chamfered by the shape of the insert 26 during the same turning. The top end portion of the insert support portion 21e has the above-mentioned recesses 21k, 21l and the recess 21m which make the top end center concave. Machining can be executed without interference between the workpiece 17 and the insert supporting portion 21e.

Groove machining of an outer diameter is executed in FIG. 12. The insert 23 is selected. The B-axis angle α of the axial center CT3 of the complex tool 21 is positioned at 110°. Rotation is in the direction of arrow M. The top end center is concave in shape and no interference occurs between the workpiece 17 and the insert supporting portion 21e of the main body 21a.

Recess machining is executed in FIG. 13 with insert 23. The B-axis angle α of the axial center CT3 is 105°. In other respects the operation proceeds as already described.

The above-mentioned embodiments refer to a plurality of exemplary machining operations with the complex tool 21. Other machining operations also can be executed by properly selecting an appropriate insert and properly setting the B-axis angle α of the axial center CT3, as long as the other inserts do not interfere with the insert that is in use, in addition to the above-mentioned machining operations and embodiments.

In the above-mentioned embodiments, the chosen insert and the B-axis angle α of the axial center CT3 are automatically determined by the machining program. But, manually controlled selection and positioning are also possible.

Having an insert installed on each insert installation face 21q, located facing each chip pocket 21d, is among the above-mentioned examples. However, two or more may be provided as opposed to just one.

The present invention is explained on the basis of the embodiments heretofore. The embodiments which are described in this specification are illustrative and not limiting. The scope of the invention is defined by the accompanying claims and is not restricted to the descriptions and specific embodiments. Accordingly, transformations and changes within the scope of the claims are included in the scope of the present invention.

We claim:

1. Complex tool to be installed on a machine tool capable of executing turning machining and milling machining operations, comprising:
   a main body in a bar shape, for installation of inserts at a top end of the main body such that the inserts are attachable and detachable from the main body;
   a concave portion formed on said main body, the concave portion extending radially inwardly from an outer peripheral portion of said main body toward an axial center of said main body and the concave portion also extending along said axial center direction from the top end of said main body;
   a plurality of insert installation faces formed on said main body, across said concave portion from one another;
   a plurality of said inserts, at least one of the inserts being installed on each of said insert installation faces, thereby facing opposite from another of the inserts across the concave portion; and,
   an open hole for supplying cutting oil, formed at said concave portion on a base portion side of said main body rather than a portion where said insert installation face is formed;
   whereby said cutting oil can be supplied from said complex tool while securing strength of a top end portion of said tool on which said insert installation face is formed, by providing said hole on said base portion side of said main body.

2. The complex tool as set forth in claim 1, wherein a plurality of said concave portions are formed around the main body.

3. The complex tool as set forth in claim 1, wherein said inserts located opposite from one another across said concave portion are installed on said insert installation faces such that the inserts have cutting directions that are in opposite rotational directions of the main body.

4. The complex tool as set forth in claim 1, wherein a recess is formed on said main body at least at one said insert installation face for said insert.

5. The complex tool as set forth in claim 2, wherein at least two of the inserts have a same cutting direction, of a plurality of said inserts located on a plurality of said concave portions, and wherein the inserts having the same cutting direction are provided such that their top edges are located at an equal distance from said axial center of said main body.

6. The complex tool as set forth in claim 2, wherein said insert is located such that a top edge of said insert is offset from a side of said concave portion by a predetermined distance from a radial plane intersecting said axial center of said main body.

7. The complex tool as set forth in claim 4, wherein a plurality of said recesses are formed for at least one said insert.

8. The complex tool as set forth in claim 4, wherein said recesses include a recess formed on said top end of said main body, hollowing a central portion of said main body in an axial direction.

9. The complex tool as set forth in claim 1, wherein an insert for turning machining is installed on one said insert installation face, and an insert for milling machining is installed on another said insert installation face, excluding said insert installation face having said insert for turning machining installed thereon, whereby both turning machining and milling machining can be executed by said inserts installed, without exchanging tools.

10. The complex tool as set forth in claim 1, wherein an insert for turning machining is installed on one said insert installation face, and an insert for drilling machining is installed on another said insert installation face excluding said insert installation face having said insert for turning machining installed thereon, whereby both turning machining, and drilling machining by rotating tool can be executed by said inserts installed without exchanging tools.

11. The complex tool as set forth in claim 9 or 10, wherein said insert is freely attachable and detachable on said main body.

12. The complex tool as set forth in claim 9 or 10, wherein said insert for turning machining also serves as said insert for milling machining.

13. The complex tool as set forth in claim 9 or 10, wherein said insert for turning machining also serves as said insert for drilling machining.

\* \* \* \* \*